United States Patent [19]

Röber et al.

[11] Patent Number: 5,554,426

[45] Date of Patent: Sep. 10, 1996

[54] MULTILAYER PLASTIC PIPE

[75] Inventors: Stefan Röber, Hamburg; Hans Jadamus; Hans Ries, both of Marl, all of Germany

[73] Assignee: Huels Aktiengesellschaft, Marl, Germany

[21] Appl. No.: 409,723

[22] Filed: Mar. 24, 1995

[30] Foreign Application Priority Data

Mar. 24, 1994 [DE] Germany ............................ 44 10 148.1

[51] Int. Cl.$^6$ ................................. B32B 1/08; F16L 9/14
[52] U.S. Cl. ...................... 428/36.91; 428/36.6; 428/922; 428/421; 428/474.4; 428/474.9; 428/475.2; 428/475.8; 428/476.3; 428/480; 138/137; 138/DIG. 7; 138/140; 138/141; 138/118; 206/524.5
[58] Field of Search ............................. 428/36.92, 36.91, 428/36.6, 922, 421, 474.4, 474.9, 475.2, 475.8, 476.3, 480; 138/137, DIG. 7, 118, 140, 141, 177; 206/524.5; 215/12.1; 220/86.2

[56] References Cited

U.S. PATENT DOCUMENTS

| | | | |
|---|---|---|---|
| 5,258,213 | 11/1993 | Mügge et al. | 428/36.91 |
| 5,313,987 | 5/1994 | Röber et al. | 138/137 |
| 5,362,529 | 11/1994 | Mügge et al. | 428/35.7 |
| 5,362,570 | 11/1994 | Röber et al. | 428/475.2 |
| 5,389,410 | 2/1995 | Mügge et al. | 428/34.1 |
| 5,404,915 | 4/1995 | Mügge et al. | 138/137 |
| 5,425,817 | 6/1995 | Mügge et al. | 138/137 |
| 5,449,024 | 9/1995 | Röber et al. | 138/137 |
| 5,472,784 | 12/1995 | Röber et al. | 428/421 |
| 5,474,822 | 12/1995 | Rober et al. | 428/36.91 |
| 5,478,620 | 12/1995 | Mügge et al. | 428/36.91 |

*Primary Examiner*—Charles Nold
*Attorney, Agent, or Firm*—Oblon, Spivak, McClelland, Maier & Neustadt, P.C.

[57] ABSTRACT

Multilayer plastic pipes having at least

I. a layer based on a molding composition of polyamide; and

II. a layer adjacent to layer I and based on a molding containing a mixture of
 (a) from 97.5 to 50% by weight of polyvinylidene fluoride; and
 (b) from 2.5 to 50% by weight of an acrylate copolymer, with the layers adhering to one another, are provided. These pipes exhibit improved resistance to chemical agents such as, methanol-containing fuels, without the loss of typical properties of polyamide and polyvinylidene fluoride.

22 Claims, No Drawings

MULTILAYER PLASTIC PIPE

BACKGROUND OF THE INVENTION

1. Field of the Invention

The invention relates to a multilayer plastic pipe.

2. Discussion of the Background

Plastic pipes of polyamide are known and are used for a variety of applications. To perform their function, the pipes have to be, inter alia, inert to the medium flowing in them and also resistant to high and low temperatures and mechanical stresses.

Single-layer pipes are not always able to fulfill the necessary requirements. For example, in the transport of aliphatic or aromatic solvents, fuels or the like, single layer pipes display considerable disadvantages, such as inadequate barrier action towards the medium, undesired dimensional changes or insufficient mechanical stressability. Reducing permeation is particularly important because the permissible emission values are being reduced ever further by legal requirements.

Attempts have been made to eliminate these disadvantages by means of multilayer pipes (DE-A 35 10 395; 37 15 251; 38 21 723; 40 01 125; 40 01 126). In practice these proposals can solve individual disadvantages, however, the overall property profile is still unsatisfactory.

FR-P 2 602 515 describes a two-layer pipe having an outer layer of polyamide 11 and an inner layer of plasticized polyvinylidene fluoride. Investigations have shown that the barrier action towards the medium flowing through is unsatisfactory. In particular, the permeation of methanol-containing fuels could not be reduced sufficiently.

The unpublished German Patent Application P 43 26 130.2 discloses thermoplastic multilayer composites of PVDF and polyamide. To achieve adhesion of the layers to one another, the PVDF contains small amounts of a polyglutarimide. However, multilayer pipes are not explicitly described.

SUMMARY OF THE INVENTION

Accordingly, one object of the present invention is a polyamide pipe having a good barrier action towards the medium being transported, in particular towards methanol-containing fuels.

Another object of the present invention is a polyamide pipe having satisfactory dimensional stability at high and low temperatures, and satisfactory mechanical stressability.

Still another object of the present invention is a polyamide multilayer pipe having layers that adhere to one another without the use of a layer of coupling agent, especially under prolonged action by the medium being transported.

These objects are achieved by a multilayer plastic pipe having at least

I. a layer based on a molding composition of polyamide (component I); and

II. a layer adjacent to layer I, based on a molding composition (component II) containing a mixture of
   (a) from 97.5 to 50% by weight of polyvinylidene fluoride (component a); and
   (b) from 2.5 to 50% by weight of an acrylate copolymer (component b), with the layers adhering to one another.

DETAILED DESCRIPTION OF THE PREFERRED EMBODIMENTS

The components a and b of layer II are preferably used in a weight ratio a:b of from 97.5:2.5 to 80:20 and particularly preferably from 96:4 to 90:10. Suitable components for layer I are, first and foremost, aliphatic homopolyamides and copolyamides. Examples which may be mentioned are 4.6, 6.6, 6.12, 8.10 and 10.10 polyamides or the like. Preference is given to 6, 10.12, 11, 12 and 12.12 polyamides (The numbering of the polyamides corresponds to the international standard, with the first digit(s) indicating the number of carbon atoms of the starting diamine and the last digit(s) indicating the number of carbon atoms of the dicarboxylic acid. If only one number is given, this means that the polyamide has been made from an $\alpha,\omega$-aminocarboxylic acid or from the lactam derived therefrom, see H. Domininghaus, Die Kunststoffe und ihre Eigenschaften, page 272, VDI (1976)). If copolyamides are used, these can contain, for example, adipic acid, sebacic acid, suberic acid, isophthalic acid or terephthalic acid as co-acid, or bis(4-aminocyclohexyl)methane, trimethylhexamethylenediamine, hexamethylenediamine or the like as co-diamine. The preparation of these polyamides are known (e.g.: D. B. Jacobs, J. Zimmermann, Polymerization Processes, p. 424–467; Interscience Publishers, New York (1977); DE-B 21 52 194).

Likewise suitable as polyamides are mixed aliphatic/aromatic polycondensates such as those described in, for example, U.S. Pat. Nos. 2,071,250, 2,071,251, 2,130,523, 2,130,948, 2,241,322, 2,312,966, 2,512,606, 3,393,210, or in Kirk-Othmer, Encyclopedia of Chemical Technology, 3rd edition, vol. 18, Wiley & Sons (1982), pp. 328 and 435. Further polycondensates which are suitable as polyamides are poly(ether esteramides) or poly(etheramides). These products are described in, for example, DE-A 27 12 987, 25 23 991 and 30 06 961.

Both polyamides having predominantly amino terminal groups and those having predominantly carboxylic acid terminal groups can be used. Preference is given to polyamides having predominantly amino terminal groups.

The molecular weight (number average) of the polyamides is above 4,000, preferably above 10,000. The relative viscosity is here preferably in the range from 1.65 to 2.4 (DIN 53 727/ISO 307).

The polyamides can contain up to 40% by weight of other thermoplastics, if these do not interfere with the properties of the invention. In particular polycarbonate [H. Schnell, Chemistry and Physics of Polycarbonates, Interscience Publishers, New York (1981)], acrylonitrile-styrene-butadiene copolymers [Houben-Weyl, Methoden der organischen Chemie, vol. 14/1, Georg Thieme Verlag Stuttgart, pp. 393–406; Ullmanns Encyclopädie der technischen Chemie, 4th edition, vol. 19, Verlag Chemie Weinheim (1981), pp. 279–284], acrylonitrile-styrene-acrylate copolymers [Ullmanns Encyclopädie der technischen Chemie, 4th edition, vol. 19, Verlag Chemie Weinheim (1981), pp. 277–295], acrylonitrile-styrene copolymers [Ullmanns Encyclopädie der technischen Chemie, 4th edition, vol. 19, Verlag Chemie Weinheim (1981), p. 273 ff.] or polyphenylene ethers (DE-A 32 24 691 and 32 24 692; U.S. Pat. Nos. 3,306,874, 3,306,875 and 4,028,341), should be mentioned here.

If required, the polyamides can be toughened. Suitable modifiers are, for example, ethylene-propylene or ethylene-propylene-diene copolymers (EP-A-0 295 076), polypentenylene, polyoctenylene or random or block copolymers of alkenylaromatic compounds and aliphatic olefins or dienes (EP-A-0 261 748). Furthermore, the impact-toughening rubbers can be core/shell rubbers having a viscoelastic core of (meth)acrylate, butadiene or styrenebutadiene rubber with glass transition temperatures $T_g < -10°$ C. The core may be crosslinked.

The shell can be built up of styrene and/or methyl methacrylate and/or further unsaturated monomers (DE-A 21 44 528, 37 28 685). The proportion of impact-toughening components should be selected so that the desired properties are not impaired.

Component a of layer II contains polyvinylidene fluoride, which is preferably used in unplasticized form. Preparation and structure of the polymer is known (Hans R. Kricheldorf, Handbook of Polymer Synthesis, Part A, Verlag Marcel Dekker Inc. New York—Basel—Hongkong, pp. 191 ff.; Kunststoff-Handbuch, 1st edition, vol. XI, Carl Hanser Verlag Munich (1971), pp. 403 ff.).

The polyvinylidene fluoride present can also be a copolymer based on vinylidene fluoride, which contains up to 40% by weight of other monomers. Examples of other monomers are trifluoroethylene, ethylene, propene and hexafluoropropene.

The polyvinylidene fluoride used according to the invention generally has a melt flow index of $<17$ g/10 min, preferably from 2 to 13 g/10 min (DIN 53 735).

The component b of layer II is an acrylate copolymer containing at least the following basic building blocks:

(i) from 14 to 85% by weight, preferably from 35 to 70% by weight, of

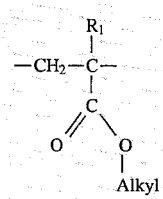

(ii) from 0 to 75% by weight, preferably from 10 to 75% by weight, more preferably 20 to 40% by weight, of

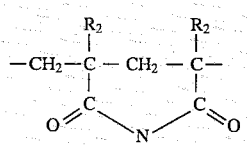

(iii) from 0 to 15% by weight of

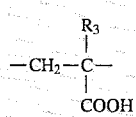

(iiii) from 7 to 20% by weight, preferably from 8 to 12% by weight, of

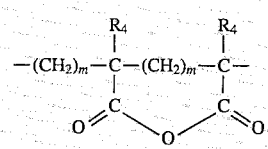

In the specified formulae,

Alkyl is methyl, ethyl, propyl, butyl, pentyl or hexyl, $R_1$ to $R_5$ is H or $(C_nH_{2n+1})$, with $n=1$ to 6 and $m=0$ or 1, with the radicals $R_1$ to $R_5$ being either identical or different. Preferably $R_1$ to $R_5$ are all methyl radical, Alkyl is methyl and m is 1.

The acrylate copolymers are prepared in a known manner by polymerization of the corresponding monomers. In the case of m=0 and $R_4$=H, the basic building block (iiii) is derived, for example, from maleic anhydride, while in the case of m=1, the basic building block (iiii) is formed by saponification of two adjacent units of the component (i) and subsequent cyclization. The acrylate copolymers used according to the invention generally have a melt flow index of <30 g/10 min, preferably from 0.2 to 15 g/10 min.

In a preferred embodiment, the basic building block (ii) is present in an amount of from 10 to 75% by weight, particularly preferably from 20 to 40% by weight. Such polymers are also described as polyglutarimides. These are poly(alkyl acrylates), in which two adjacent carboxylate groups have been reacted to form a cyclic acid imide. The imide formation is preferably carried out using ammonia or primary amines, such as, methylamine. Here, because of the presence of water in the imide formation reaction, part of the basic building blocks (i) is saponified to give the basic building blocks (iii) and (iiii). The products and their preparation are known (Hans R. Kricheldorf, Handbook of Polymer Synthesis, Part A, Verlag Marcel Dekker Inc. New York—Basel—Hongkong, pp. 223 ff.; H. G. Elias, Makromolekule, Hüthig und Wepf Verlag Basel—Heidelberg—New York; U.S. Pat. Nos. 2,146,209, 4,246,374).

To increase the low-temperature impact toughness, the acrylate copolymers can additionally contain appropriate modifiers. Examples are core/shell polymers having a polybutyl acrylate core and a shell of polymethyl methacrylate and/or polyglutarimide. Apart from the examples given, further modifiers are possible.

Conventional auxiliaries and additives which may be added to the molding compositions for the layers I and II are for example, flame retardants, stabilizers, plasticizers, processing aids, viscosity improvers, fillers, additives for improving the electrical conductivity, pigments or the like. The amount added of the specified agents is to be selected so that the desired properties are not seriously affected.

The preparation of the molding composition for layer II is carried out according to conventional and known processes of melt mixing of the components a and b of layer II in a mixer providing good compounding, in for example, a twin-screw compounder, at temperatures which depend on the melting points of the components a and b, generally at temperatures between 200° and 300° C.

The preparation of the composition for layer II from the components a and b can also be carried out directly in the processing extruder in which the composition is processed for the production of the thermoplastic multilayer composite with the layer I.

The smaller the content of component b in the molding composition for layer II, the larger the barrier action towards the medium being transported. For example, the barrier action towards methanol-containing fuels of mixtures comprising 95% by weight of polyvinylidene fluoride polymers (component a) and 5% by weight of an acrylate copolymer of the invention (component b) is only inconsequentially smaller than the barrier action of pure polyvinylidene fluoride.

The multilayer pipes can further contain more layers of polyvinylidene fluoride polymers which are adjacent to layer II, but not to layer I. Likewise, the multilayer pipes can contain more layers of polyamide which are adjacent to layer I or layer II. In particular, the pipes can contain additional layers with the composition of layer I and/or II which have been made electrically conductive and have a surface resistance of less than $10^9 \Omega$. These layers which have been made electrically conductive are preferably on the inside. A further embodiment has layer II itself electrically conductive.

The layers are made electrically conductive by known methods. For example, an addition is made of up to about 15% by weight of, conductivity black, carbon fibers, metal powders, or the like.

The multilayer pipes of the invention can also contain, in addition to the layers I and II, (c) at least one layer based on a polyolefin; and (d) at least one layer based on a conventional coupling agent for bonds between polyolefin and polyamide, with the layer of coupling agent directly between layer I (or a layer with this composition) and the layer based on a polyolefin.

Examples of polyolefins are polyethylene and polypropylene. In principle, any commercial type can be used. Examples are linear polyethylene of high, medium or low density; LDPE; ethylene copolymers containing relatively small amounts (up to a maximum of about 40% by weight) of comonomers such as n-butyl acrylate, methyl methacrylate, maleic anhydride, styrene, vinyl alcohol or the like; isotactic or atactic homopolypropylene; random copolymers of propene with ethene and/or 1-butene; ethylene-propylene block copolymers; and other similar polymers. Such polyolefins can also contain an impact-toughening component such as EPM or EPDM rubber, or SEBS.

Suitable coupling agents for bonds between polyolefins and polyamide are known. They are based on polyolefin which is modified by suitable reactive groups. The reactive groups can be introduced either by copolymerization together with the olefin, or by means of a grafting reaction. In the grafting reaction, a preformed polyolefin is reacted in a known manner with an unsaturated functional monomer and, advantageously, a free-radical donor at elevated temperature.

Suitable reactive groups are, for example, acid anhydride groups, carboxylic acid groups, epoxide groups, oxazoline groups or trialkoxysilane groups. Of these, preference is given to acid anhydride groups. Coupling agents containing more than 0.1% by weight of anhydride groups are particularly suitable.

Suitable coupling agents are available, inter alia, under the trade names BYNEL (DuPont), PRIMACOR (Dow), POLYBOND (BP), OREVAC (Elf), HERCOPRIME (Hercules), EPOLENE (Eastman), HOSTAMONT (Hoechst), EXXELOR (Exxon) and ADMER (Mitsui Petrochemical). The coupling agents are selected according to the criteria which are known to those skilled in the art with the aid of the corresponding product descriptions. In the multilayer pipes of the present invention, all adjacent layers adhere to one another.

Table 1 shows some examples of layer arrangements in multilayer plastic pipes of the present invention.

In a preferred embodiment, the layers are arranged and the thicknesses of the layers are selected so that layers with a composition of layer II lie as close as possible to the middle of the multilayer pipe wall. This measure improves the low-temperature impact toughness of the multilayer pipes.

Furthermore, it is preferred that the thicknesses of layers with a composition of layer II are selected so that it makes up from 2 to 40% of the total wall thickness and, in particular, from 5 to 30% of the total wall thickness of the multilayered pipe. The manufacture of the multilayer plastic pipes can be carried out, for example, by coextrusion.

The multilayer plastic pipes of the present invention have exceptionally good resistance and barrier action against diffusion towards chemical agents, solvents and fuels. In addition, the layers adhere to one another so that, for example, on thermal expansion, bending or thermoforming of the multilayer pipe, no separation of the various layers from one another occurs. This good adhesion between the layers is maintained even on prolonged contact with fuels, even methanol-containing fuels.

TABLE 1

Layer arrangement of multilayer plastic pipes of the invention (buildup from outside to inside)

| Layer arrangement No. | Configuration |
| --- | --- |
| 1 | Layer I |
|   | Layer II |
| 2 | Layer I |
|   | Layer II (conductive) |
| 3 | Layer I |
|   | Layer II |
|   | Layer I |
| 4 | Layer I |
|   | Layer II |
|   | Layer I (conductive) |
| 5 | Layer I |
|   | Layer II |
|   | Layer I |
|   | Layer II |
|   | Layer I |
| 6 | Layer I |
|   | Layer II |
|   | Layer I |
|   | Layer II (conductive) |
| 7 | Layer I |
|   | Layer II |
|   | Layer I |
|   | Layer II |
|   | Layer I (conductive |
| 8 | Layer I |
|   | Layer II |
|   | Layer of polyvinylidene fluoride copolymers |
| 9 | Layer I |
|   | Layer II |
|   | Layer of polyvinylidene fluoride copolymers (conductive) |
| 10 | Layer I |
|   | Layer I (other type of polyamide) |
|   | Layer II |
| 11 | Layer II |
|   | Layer I |
| 12 | Layer of polyolefin |
|   | Layer of coupling agent |
|   | Layer I |
|   | Layer II |

The plastic pipes of the invention are preferably used for the transport of petrochemicals or for brake fluid, cooling hydraulic fluids or fuel, including methanol or ethanol containing fuel. They may be shaped as a straight, corrugated or convoluted tubing. A further application of the multilayer pipes is the manufacture of hollow bodies such as tanks or filling ports, in particular for the motor vehicles. The manufacture of these hollow bodies can be carried out, for example, by coextrusion followed by blow molding.

Other features of the invention will become apparent in the course of the following descriptions of exemplary embodiments which are given for illustration of the invention and are not intended to be limiting thereof.

EXAMPLES

The parameters specified were determined by means of the following measurement methods.

The determination of the solution viscosity (relative viscosity $\eta_{rel}$) of the polyamides was carried out using a 0.5% by weight m-cresol solution at 25° C., in accordance with DIN 53 727/ISO 307.

For determination of the amino terminal groups, 1 g of the polyamides was dissolved in 50 ml of m-cresol at 25° C. The solution was titrated potentiometrically with perchloric acid.

For determination of the carboxyl terminal groups in the polyamides, 1 g of polycondensate was dissolved in 50 ml of benzyl alcohol under a blanket of nitrogen at 165° C. The solution time was a maximum of 20 minutes. The solution was titrated with a solution of KOH in ethylene glycol (0.05 mol KOH/l) against phenolphthalein until the color changed.

The determination of the melt flow index of the acrylate copolymers was carried out at 230° C. and under a load of 3.8 kg (DIN 53 735).

The determination of the melt flow index of the polyvinylidene fluorides was carried out at 230° C. and under a load of 5 kg (DIN 53 735).

The testing of the mechanical separability at the interface was carried out using a metal wedge (cutting angle: 5 degrees; loading weight: 2.5 kg) which was used to try to separate the material interface layer to be tested. If separation occured at the interface between the components, the adhesion was poor. If, on the other hand, separation occurs completely or partially within one of the two components, good adhesion was present.

The determination of the diffusion of fuel constituents was carried out on pipes using a fuel mixture (fuel M 15: 42.5 parts by volume of isooctane, 42.5 parts by volume of toluene and 15 parts by volume of methanol) at 60° C. The test specimens, having a length of 500 mm, had the fuel mixture running through the inside. The determination of the fuel diffusion was carried out by the activated carbon adsorption method. The diffusion was measured as loss in mass over time (measurement every 24 hours). The measure given was the loss in mass recorded per unit area which was measured when the diffusion process was at equilibrium, i.e. when the loss in mass determined per 24 hours no longer changed with time.

Examples denoted by letters are Comparative Examples.

Component I

PA 1: Polyamide 12 ($\eta_{rel}$: 2.1; plasticizer content: 0; amino terminal group content: 9 mmol/kg; carboxyl terminal group content: 48 mmol/kg; VESTAMID® L 2140—HÜLS AG)

PA 2: Polyamide 12 ($\eta_{rel}$: 2.1; plasticizer content per 100 parts by weight of polyamide: 15 parts by weight of N-n-butylbenzenesulphonamide; amino terminal group content: 9 mmol/kg; carboxyl terminal group content: 48 mmol/kg; VESTAMID® L 2124—HÜLS AG)

PA 3: Polyamide 12 ($\eta_{rel}$: 2.1; plasticizer content per 100 parts by weight of polyamide: 15 parts by weight of N-n-butylbenzenesulphonamide; amino terminal group content: 50 mmol/kg; carboxyl terminal group content: 8 mmol/kg)

PA 4: Polyamide 612($\eta_{rel}$: 1.9; plasticizer content: 0; amino terminal group content: 93 mmol/kg; carboxyl terminal group content: 29 mmol/kg)

PA 5: Molding composition consisting of
a. 100 parts by weight of polyamide 12 ($\eta_{rel}$: 2.1; plasticizer content: 0; amino terminal group content: 9 mmol/kg; carboxyl terminal group content: 48 mmol/kg)

and b. 4 parts by weight of commercial conductivity black (Ketjenblack® EC 300—AKZO)

Component II

PVDF 1: Polyvinylidene fluoride (melt flow index: 13 g/10 min, DYFLOR® LE—HÜLS AG).

PVDF 2: Polyvinylidene fluoride (melt flow index: 8.5 g/10 min, DYFLOR® EE—HÜLS AG)

PVDF 3: Polyvinylidene fluoride consisting of
(1) 100 parts by weight of polyvinylidene fluoride (melt flow index: 8.5 g/10 min, DYFLOR® EE—HÜLS AG)

and (2) 6 parts by weight of commercial conductivity black (Ketjenblack® EC 300—AKZO).

The polymers used for the component b of layer II are built up of the building blocks denoted above by (i) to (iiii), with Alkyl and $R_1$ to $R_5$ being methyl in each case and m being 1.

TABLE 2

|  | P1 | P2 | P3 | P4 |
|---|---|---|---|---|
| % by weight of i) | 100 | 14 | 11 | 57 |
| % by weight of ii) | 0 | 86 | 80 | 30 |
| % by weight of iii) | 0 | 0 | 6 | 3 |
| % by weight of iiii) | 0 | 0 | 3 | 10 |
| Melt flow index [g/10 min] | 0.8 | 0.4 | 0.4 | 0.4 |

| Z1: | Mixture consisting of |
|---|---|
|  | (a) 50% by weight of PVDF 1; and (b) 50% by weight of P1 |
| Z2: | Mixture consisting of |
|  | (a) 50% by weight of PVDF 1; and (b) 50% by weight of P2 |
| Z3: | Mixture consisting of |
|  | (a) 50% by weight of PVDF 1; and (b) 50% by weight of P3 |
| Z4: | Mixture consisting of |
|  | (a) 50% by weight of PVDF 1; and (b) 50% by weight of P4 |
| Z5: | Mixture consisting of |
|  | (a) 90% by weight of PVDF 1; and (b) 10% by weight of P4 |
| Z6: | Mixture consisting of |
|  | (a) 95% by weight of PVDF 2; and (b) 5% by weight of P4 |
| Z7: | Mixture consisting of |
|  | (a) 90% by weight of PVDF 3; and (b) 10% by weight of P4 |

The preparation of the mixtures was carried out in a twin-screw compounder at a composition temperature of 260° C.

Production of the Multilayer Pipes According to Examples 1 to 12 and Comparative Examples A to G The pipes were produced on a laboratory extrusion facility using a five-layer die (in the production of the two-, three- and four-layer pipes, the channels not required remain closed) (See Tables 3 and 4). The barrel temperatures were 230° C. (PA 1, PA 2, PA 3); 250° C. (PVDF 1, PVDF 2, PVDF 3, Z 1 to Z 7) and 280° C. (PA 4, PA 5). The tubes produced had an external diameter of 8 mm and a total wall thickness of 1 mm.

TABLE 3

Comparative Examples

| Experiment | Composition of layers from outside to inside | | Diffusion [g/(d m²)] at 60° C. | Mechanically separable at the interfaces after storage at 23° | after storage in fuel(*) |
|---|---|---|---|---|---|
| A | PA 1 (single-layer pipe) | (1.0 mm) | 600 | (*) | (*) |
| B | PA 2 (single-layer pipe) | (1.0 mm) | 410 | (*) | (*) |
| C | PA 1 | (0.9 mm) | 30 | yes | yes |
|   | PVDF 1 | (0.1 mm) |   |   |   |
| D | PA 3 | (0.9 mm) | (**) | yes | yes |
|   | Z 1 | (0.1 mm) |   |   |   |
| E | PA 2 | (0.8 mm) | 30 | yes (PA 2 from Z 1) | yes (PA 2 from Z 1) |
|   | Z 1 | (0.1 mm) |   |   |   |
|   | PVDF 1 | (0.1 mm) |   |   |   |
| F | PA 3 | (0.9 mm) | (**) | yes | yes |
|   | Z 2 | (0.1 mm) |   |   |   |
| G | PA 4 | (0.9 mm) | (**) | yes | yes |
|   | Z 3 | (0.1 mm) |   |   |   |

(*) Storage at 23° C. for 20 days in standard fuel M 15 (42.5% by volume of isooctane, 42.5% by volume of toluene and 15% by volume of methanol)
(**) Diffusion was not determined.
(***) Single-layer pipe; there is no interface.

TABLE 4

Experiments according to the invention

| Experiment | Composition of layers from outside to inside | | Diffusion [g/(d m²)] at 60° C. | Mechanically separable at the interfaces after storage at 23° | after storage in fuel(*) |
|---|---|---|---|---|---|
| 1 | PA 1 | (0.8 mm) | 40 | no | no |
|   | Z 5 | (0.2 mm) |   |   |   |
| 2 | PA 1 | (0.9 mm) | 60 | no | no |
|   | Z 6 | (0.1 mm) |   |   |   |
| 3 | PA 2 | (0.8 mm) | <30 | no | no |
|   | Z 6 | (0.1 mm) |   |   |   |
|   | PVDF 1 | (0.1 mm) |   |   |   |
| 4 | PA 2 | (0.8 mm) | 50 | no | no |
|   | Z 6 | (0.1 mm) |   |   |   |
|   | PVDF 3 | (0.05 mm) |   |   |   |
| 5 | PA 3 | (0.9 mm) | 75 | no | no |
|   | Z 7 | (0.1 mm) |   |   |   |
| 6 | PA 4 | (0.8 mm) | <35 | no | no |
|   | Z 4 | (0.1 mm) |   |   |   |
|   | PVDF 2 | (0.1 mm) |   |   |   |
| 7 | PA 2 | (0.45 mm) | 60 | no | no |
|   | Z 6 | (0.1 mm) |   |   |   |
|   | PA 2 | (0.45 mm) |   |   |   |
| 8 | PA 2 | (0.45 mm) | <60 | no | no |
|   | Z 6 | (0.1 mm) |   |   |   |
|   | PA 3 | (0.4 mm) |   |   |   |
|   | Z 7 | (0.05 mm) |   |   |   |
| 9 | PA 1 | (0.8 mm) | 70 | no | no |
|   | Z 5 | (0.1 mm) |   |   |   |
|   | PA 5 | (0.1 mm) |   |   |   |
| 10 | PA 2 | (0.3 mm) | <60 | no | no |
|   | Z 6 | (0.05 mm) |   |   |   |
|   | PA 2 | (0.3 mm) |   |   |   |
|   | Z 6 | (0.05 mm) |   |   |   |
|   | PA 2 | (0.3 mm) |   |   |   |
| 11 | PA 1 | (0.5 mm) | 65 | no | no |
|   | Z 5 | (0.05 mm) |   |   |   |
|   | PA 1 | (0.3 mm) |   |   |   |
|   | Z 5 | (0.05 mm) |   |   |   |
|   | PA 5 | (0.1 mm) |   |   |   |

TABLE 4-continued

Experiments according to the invention

| Experiment | Composition of layers from outside to inside | | Diffusion [g/(d m$^2$)] at 60° C. | Mechanically separable at the interfaces | |
|---|---|---|---|---|---|
| | | | | after storage at 23° | after storage in fuel(*) |
| 12 | Z 6 | (0.2 mm) | 60 | no | no |
| | PA 3 | (0.8 mm) | | | |

(*) Storage at 23° C. for 20 days in standard fuel M 15 (42.5% by volume of isooctane, 42.5% by volume of toluene and 15% by volume of methanol).

As can be seen from Table 4, Experiments 1–12, which correspond to the present invention, exhibit low diffusion of fuels (75 g/dm$^2$ or less, at 60° C.), and good adhesion (no separability at the interfaces). In contrast, Table 3, with the results of Experiments A–G, Comparative Examples, exhibit high diffusion of fuels (600 or 412 g/dm$^2$ at 60° C.), or poor adhesion (separability at the interfaces). The Experiments which correspond to the present invention are superior to the Comparative Examples.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multilayer plastic pipe, comprising:

(1) a first layer comprising polyamide; and (2) a second layer adjacent to the first layer, comprising,
 (a) from 97.5 to 50% by weight of polyvinylidene fluoride or vinylidene fluoride copolymer; and
 (b) from 2.5 to 50% by weight of an acrylate copolymer, wherein the first and second layers adhere to one another, and the acrylate copolymer comprises:

(i) from 14 to 85% by weight of

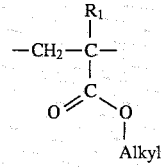

(ii) from 0 to 75% by weight of

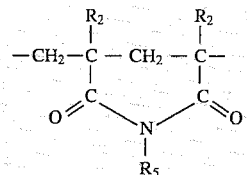

(iii) from 0 to 15% by weight of

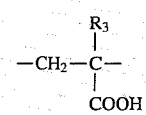

(iiii) from 7 to 20% by weight of

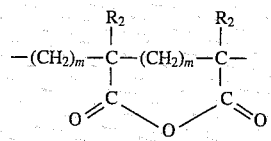

wherein m is 0 or 1,

Alkyl is methyl, ethyl, propyl, butyl, pentyl, hexyl, and $R_1$ to $R_5$ is H or ($C_nH_{2n+1}$), n is 1 to 6, and $R_1$ to $R_5$ can be identical or different.

2. The multilayer plastic pipe of claim 1, wherein the second layer comprises:

(a) from 97.5 to 80% by weight of polyvinylidene fluoride or vinylidene fluoride copolymer; and (b) from 2.5 to 20% by weight of acrylate copolymer.

3. The multilayer plastic pipe of claim 1, wherein the second layer comprises:

(a) from 96 to 90% by weight of polyvinylidene fluoride; and (b) from 4 to 10% by weight of acrylate copolymer.

4. The multilayer plastic pipe according to claim 1, wherein the acrylate copolymer comprises:

(i) from 35 to 70% by weight of

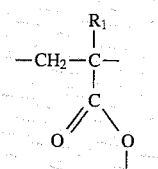

(ii) from 10 to 75% by weight of

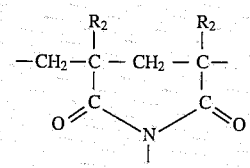

(iii) from 0 to 15% by weight of $$-CH_2-\underset{\underset{COOH}{|}}{\overset{\overset{R_3}{|}}{C}}-$$

(iiii) from 8 to 12% by weight of $$-(CH_2)_m-\underset{\underset{O}{\overset{C}{\diagdown}}\diagup\underset{O}{\overset{C}{\diagup}}}{\overset{\overset{R_2}{|}}{C}}-(CH_2)_m-\underset{}{\overset{\overset{R_2}{|}}{C}}-$$

wherein m is 0 or 1,

Alkyl is methyl, ethyl, propyl, butyl, pentyl, hexyl, $R_1$ to $R_5$ is H or $(C_nH_{2+n})$ n is 1 to 6, and $R_1$ to $R_5$ can be identical or different.

5. The multilayer plastic pipe according to claim 1, wherein the acrylate copolymer comprises:

(i) from 35 to 70% by weight of $$-CH_2-\underset{\underset{\underset{Alkyl}{|}}{\overset{C}{\diagdown}\diagup\overset{O}{}}}{\overset{\overset{R_1}{|}}{C}}-$$

(ii) from 20 to 40% by weight of $$-CH_2-\underset{\underset{O}{\overset{C}{\diagdown}}\diagup\underset{\underset{R_5}{|}}{N}}{\overset{\overset{R_2}{|}}{C}}-CH_2-\underset{}{\overset{\overset{R_2}{|}}{C}}-$$

(iii) from 0 to 15% by weight of $$-CH_2-\underset{\underset{COOH}{|}}{\overset{\overset{R_3}{|}}{C}}-$$

(iiii) from 8 to 12% by weight of $$-(CH_2)_m-\underset{\underset{O}{\overset{C}{\diagdown}}\diagup\underset{O}{\overset{C}{\diagup}}}{\overset{\overset{R_2}{|}}{C}}-(CH_2)_m-\underset{}{\overset{\overset{R_2}{|}}{C}}-$$

wherein m is 1,

Alkyl is methyl, ethyl, propyl, butyl, pentyl, hexyl, $R_1$ to $R_5$ is H or $(C_nH_{2+n})$ n is 1 to 6, and $R_1$ to $R_5$ can be identical or different.

6. The multilayer plastic pipe of claim 1 wherein the first layer comprises polyamide 12.

7. The multilayer plastic pipe of claim 1, wherein Alkyl, and $R_1$ to $R_5$, are all methyl.

8. The multilayer plastic pipe of claim 1, wherein the first or second layer has a surface resistance of less than $10^9\Omega$.

9. The multilayer plastic pipe of claim 1, wherein the polyvinylidene fluoride or vinylidene fluoride copolymer has a melt flow index of less than 17 g/10 min.

10. The multilayer plastic pipe of claim 1, wherein the plastic pipe further comprises a third layer.

11. The multilayer plastic pipe of claim 1, wherein the plastic pipe further comprises (3) a third layer, adjacent to the second layer, comprising polyvinylidene fluoride or vinylidene fluoride copolymer.

12. The multilayer plastic pipe of claim 11, wherein the third layer has a surface resistance of less than $10^9\Omega$.

13. The multilayer plastic pipe of claim 1, wherein the innermost layer has a surface resistance of less than $10^9\Omega$.

14. The multilayer plastic pipe of claim 1, further comprising (3) a third layer comprising polyolefin; and (4) a fourth layer comprising conventional coupling agent for bonds between polyolefin and polyamide, wherein the fourth layer is directly between the first layer and the third layer.

15. A convoluted or corrugated tube, manufactured from the multilayered plastic pipe of claim 1.

16. A hollow body, manufactured from the multilayered plastic pipe of claim 1.

17. A filling port or tank for a motor vehicle, manufactured from the multilayered plastic pipe of claim 1.

18. A method for conveying a liquid substance from a first container to a second container, comprising the steps of:

permitting said liquid substance in said first container to enter said multilayer plastic pipe of claim 1, and flow along said pipe to said second container, and permitting said liquid to leave said pipe and enter said second container, wherein said pipe is in fluid communication with said first or second container throughout said method.

19. The method for conveying a liquid substance of claim 18, wherein the liquid substance is break fluid for a motor vehicle.

20. The method for conveying a liquid substance of claim 18, wherein the liquid substance is cooling fluid for a motor vehicle.

21. The method for conveying a liquid substance of claim 18, wherein the liquid substance is hydraulic fluid for a motor vehicle.

22. The method for conveying a liquid substance of claim 18, wherein the liquid substance is a petrochemical material.

* * * * *